No. 790,844. PATENTED MAY 23, 1905.
J. W. JONES.
SPRING SWIVEL JOURNAL BEARING.
APPLICATION FILED NOV. 17, 1904.
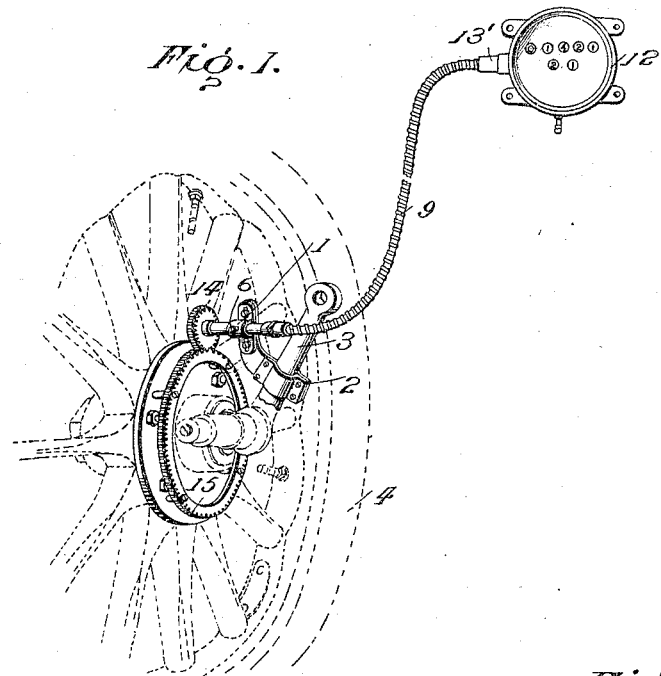
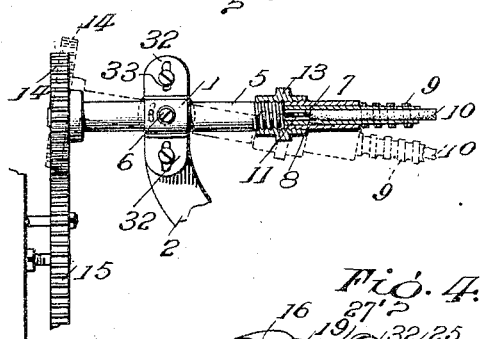
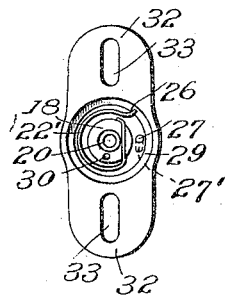
Witnesses
Inventor
Joseph W. Jones,
By
Mauro, Cameron, Lewis & Massie,
Attorneys.

No. 790,844. Patented May 23, 1905.

UNITED STATES PATENT OFFICE.

JOSEPH W. JONES, OF NEW YORK, N. Y.

SPRING-SWIVEL JOURNAL-BEARING.

SPECIFICATION forming part of Letters Patent No. 790,844, dated May 23, 1905.

Application filed November 17, 1904. Serial No. 233,198.

*To all whom it may concern:*

Be it known that I, JOSEPH W. JONES, a resident of New York, State of New York, have invented a new and useful Improvement in Spring-Swivel Journal-Bearings, which invention is fully set forth in the following specification.

This invention relates to journal-bearings, and especially to revoluble bearings for supporting shafts or spindles connected to flexible shafts operating odometers or speedometers and wherein it is desired to automatically throw the spindle out of alinement to avoid accidental breaking of the cogs of the driving-gears and also to provide a means for holding the cog or friction wheel yieldingly against the revoluble part of a vehicle-wheel the revolutions of which it is desired to register.

Heretofore speed and distance registering devices—such as speedometers, odometers, and similar devices—have been connected to some revoluble part of the vehicle by means of a flexible shaft taking its power from a friction or star wheel operated from the hub or other part of the vehicle-wheel. In such arrangements the friction-wheel is fast to a short shaft or spindle which is supported in rigid bearings attached, for example, to the steering-knuckle of the automobile. It has been found in using odometers when a friction-wheel revolves in contact with a bearing-surface on the vehicle-wheel that after a time its contact becomes more or less uncertain and fails to properly rotate the flexible shaft connected to the registering device located in the vehicle, thereby making the record inaccurate. Then, again, in those cases where a star-wheel is used in place of a friction-wheel taking its movement from a tappet the shaft carrying the star-wheel is apt to be thrown out of alinement, thereby causing its teeth to miss the tappet, and thus fail to properly communicate the motion of the vehicle-wheel to the instrument.

In order to secure a more positive engagement of the small wheel which is on the spindle to which the flexible shaft is attached and to avoid the objection above pointed out, I propose to journal the spindle carrying the small wheel in a revoluble bearing which will yieldingly hold the small wheel against the moving part of the vehicle-wheel. Although I prefer to use a small gear-wheel on the end of the spindle, a friction-wheel may be used and certain advantages of my invention still secured. In using a gear-wheel for turning the flexible shaft mud and dirt may sometimes clog the teeth; but owing to the manner of supporting the spindle in a yielding bearing there is no danger of breaking the teeth on the wheel nor of breaking the spindle carrying the wheel. The small gear-wheel is merely pushed away from its companion and rides over it without injury till the obstruction is removed. In case of the use of a friction-wheel to rotate the flexible shaft a positive force is continually exerted through the agency of the yielding bearing to hold the friction-wheel against its bearing-surface on the vehicle-wheel, thereby transmitting in a positive manner the motion of the latter to the odometer.

Certain mechanical expressions of the inventive idea involved are shown in the accompanying drawings, which are designed merely as illustrations to assist in the description of the invention and not as defining the limits thereof.

Figure 1 is a perspective view of the swivel-bearing, showing it mounted on the steering-knuckle of the vehicle-wheel. Fig. 2 is a front elevation, in part section, showing bearing and shaft in different positions. Fig. 3 is a rear view of the supporting-plate with certain parts removed to show the bearing-spring. Fig. 4 is a view in perspective, showing the parts separated.

Referring to the drawings, 1 is a swivel journal-bearing supported on bracket 2, fast to the steering-knuckle 3 on the steering-wheel of a vehicle, such as an automobile-wheel 4. Passing through bearing 1 is a shaft-supporting tube 5, held fast in the bearing by means of a set-screw 6. A spindle 7, one end of which is shown projecting from the end of tube 5, Fig. 2, and which is hollow, is provided at one end with a slot 8 for receiving the end of a flexible driving-shaft 9, the interior cable 10 of which is provided with a lug 11 for engaging the slot 8 in the end of the spindle 7. The other end of the flexible cable 9 is connected in a similar manner to a speed or distance registering device, such as a speedometer or odometer 12, and both ends of the flexible shaft 9 are provided with suitable coupling devices 13 13' for connecting the ends of the flexible shaft 9 to the supporting-tube 5 and the registering device. Fast to the opposite end of spindle 7 is a small gear-wheel 14, adapted to engage a toothed plate 15, fast to a movable part of the vehicle-wheel, such as the hub of wheel 4.

Referring now to Figs. 3 and 4, 16 is a revoluble journal or head, provided with an opening 17, through which the spindle-supporting tube 5 passes and is held fast on the head by set-screw 6. This head 16 is provided with a pivotal lug 18 extending from the bottom of the head 16, which latter constitutes a bearing-shoulder 19 for the head. The shaft 18 is provided with a screw-threaded passage 20 for receiving a retaining-screw 21 and a slot 22 for holding a swivel-actuating spring 22. 23 is a supporting member, housing, or casing, which serves both to support the head 16 and contain the restraining-spring 22'. This casing is provided at one end with a small cylindrical opening 24 for receiving the shaft 18, attached to head 16, while at the other end there is a chamber 25, into which the end of shaft 18 projects and which also contains the restraining-spring 22'. One end of this spring is fast to the end of pivotal lug 18 in a slot 22, and the other end enters the side wall of the casing at 26. In order to limit the play of the head 16 and hold the spring 22 under tension, a pin 27 is located at one side of the opening 24 and enters a slot 27', located in the head 16. To prevent longitudinal movement of lug 18 and to retain the spring 22' in chamber 25, there is provided a plate 28, resting on a countersunk ledge 29 in the casing 23. This plate is made to turn with lug 18 by means of a pin 30 on the end of shaft 18, which enters a hole 31 in plate 28. The plate 28 and head 16 are held snugly against their respective bearings by means of screw 21, which enters the end of the lug 18 attached to head 16. The casing 23 is also provided with side flanges 32, having slots 33, which permit the device to be fastened to a suitable bracket and to be adjusted to different positions.

Having thus given a detailed description of the several parts of the device, its operation is as follows: The several elements of the swivel-bearing having been assembled, the flanges 31 are screwed down on bracket 2 after proper adjustment of the gear 14 to the toothed plate 15. The end of the flexible cable 10, with its lug 11, is inserted into the slotted end of spindle 7 and the coupling 13 screwed onto the end of the supporting-tube 5. The rotation of the vehicle-wheel will now impart motion to small gear 14. The engagement of the two wheels 14 15 through their gears being positive, there will be no slipping, and as the difference in diameters of the wheels is practically constant and will remain so the ratio of their speeds will be constant, and therefore the registering device will receive a correct representation of the movement of the vehicle-wheel. If for any reason mud or dirt should clog the cogs of the gears, there will be no binding or danger of breaking the teeth, for the reason that when such clogging occurs the small cog-wheel 14 is forced outward, and as it is supported on a spindle 7, running in a tube 5, fast in a yielding bearing, the bearing turns on its pivotal lug 18 against the tension of spring 22' into position shown in dotted lines, Fig. 2, thereby permitting the small cog-wheel to ride over the teeth of the large gear without danger to the construction till the attendant can remove the obstruction. When this device is used to run the shaft for a speedometer, the speedometer itself will give warning of the irregularity in the working of the drive-gear by irregular speed indications and notify the occupant to remove the obstruction. The spring 22' will then return the gear into mesh with its companion.

Although I have described this spring-controlled bearing as especially adapted for use in connection with a drive-gear and flexible shaft, yet it is also adapted to be used in other relations—as, for example, in connection with a friction-wheel. In this case the flanges 31 of the bearing are set to give a yielding pressure to the friction-wheel against the moving part of the vehicle-wheel, thereby insuring a positive contact and rotation of the friction-wheel.

What is claimed is—

1. In a shaft-bearing, the combination of a shaft-supporting revoluble head, a supporting member for said head and a yielding restraining means for the head.

2. In a shaft-bearing, the combination of a shaft-supporting revoluble head, a supporting member for said head and a spring for restraining the movement of the head.

3. In a shaft-bearing, the combination of a shaft-supporting head, a supporting member for said head and a yielding restraining means intermediate said head and supporting member.

4. In a shaft-bearing, the combination of a shaft-supporting revoluble head, a housing supporting said head, and yielding restraining means for said head in said housing.

5. In a shaft-bearing, the combination of a shaft-supporting head, said head provided with a pivotal lug, a supporting member for receiving said lug, and yielding restraining means intermediate said lug and supporting member.

6. In a shaft-bearing, the combination of a shaft-supporting head, said head provided with a pivotal lug, a supporting member for receiving said lug, yielding restraining means intermediate said lug and supporting member, and means holding said restraining means under tension.

7. In a shaft-bearing, the combination of a shaft-supporting head, said head provided with a pivotal lug, a supporting member for receiving said lug, a restraining-spring intermediate said lug and supporting member, said member having a chamber for receiving said spring, means holding said spring under tension, and restraining means for said spring and lug.

8. In a shaft-bearing, the combination of a shaft-supporting head, said head provided with a slot and a pivotal lug, a supporting member for receiving said lug and provided with a limiting and restraining pin for engaging said slot, a spring intermediate said lug and supporting member, said member having a chamber for receiving said spring and a plate fast to said lug for retaining the said parts in place.

9. In combination, a flexible shaft, a spindle coupled to said shaft, a pivotal journal-bearing for said spindle, and yielding restraining means for said bearing.

10. In combination, a flexible shaft provided with an inner cable having a terminal lug, a slotted hollow spindle engaging said lug, a supporting-tube for said spindle and coupling means for said tube and shaft, a pivotal journal-bearing supporting said tube and yielding restraining means for said bearing.

In testimony whereof I have signed this specification in the presence of two subscribing witnesses.

JOSEPH W. JONES.

Witnesses:
   GEO. L. HOLMES,
   H. HELLER.